UNITED STATES PATENT OFFICE.

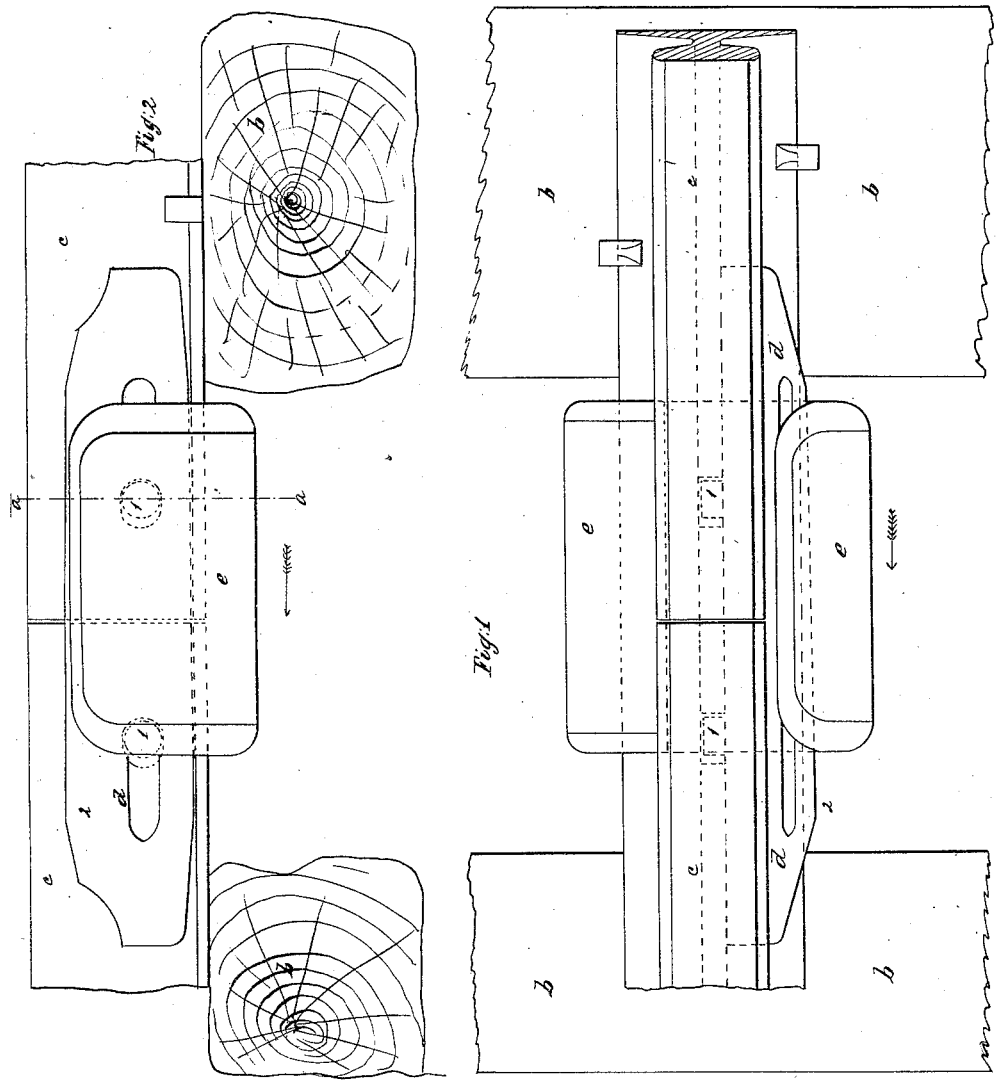

HENRY H. GRAHAM, OF PATERSON, NEW JERSEY.

CONNECTION FOR THE ENDS OF RAILROAD-RAILS.

Specification of Letters Patent No. 27,444, dated March 13, 1860.

*To all whom it may concern:*

Be it known that I, HENRY H. GRAHAM, of Paterson, in the county of Passaic and State of New Jersey, have invented, made, and applied to use a certain new and useful Improvement in Connections for the Ends of Railroad-Bars; and I do hereby declare that the following is a full, clear, and exact description of the construction and operation of the same, reference being had to the annexed drawing, making part of this specification, wherein—

Figure 1, is a plan of my said connection. Fig. 2, is a side elevation and Fig. 3, is a cross section at the line $a, a$, of Fig. 2.

Similar marks of reference denote the same parts.

The nature of my said invention consists in a tapering bar combined with a clamp that is driven thereonto at the joint between the bars, and acts to bind the rails, bar, and clamp together in such a firm manner that the ends of the rail cannot separate, and the wear consequent upon looseness at the ends of the rails is effectually prevented.

In the drawing $b$ represents one of the cross ties, and $c, c$, are the ends of the railroad bars to be united; $d$ is the connecting bar formed to set into the outer sides of the rails, and provided with lugs $l, l$, entering elongated holes in the ends of the rails whereby said connecting bar is prevented from sliding endwise, but expansion and contraction in the bars are allowed for.

$e$, is my connecting clamp that is driven onto the connecting bar $d$, after the ends of the rails have been set together; and said bar $d$, being tapering and thicker at the end 2, causes the clamp $e$, to bind every part firmly as the same is driven on in the direction of the arrow; and by placing the cross tie close to the clamp, the possibility of the same working off is prevented, and if the parts become loose from strain or wear it is only necessary to drive the clamp $e$, farther along.

My said invention will be seen to differ essentially from the ordinary fish bar that has been bolted onto the rails, and also from the wedge chain heretofore constructed in which the wedge was driven into place and the chain remained stationary; in that case the wedge might be knocked out by designing persons, or work loose and cease to be efficacious, whereas my connecting bar or wedge being provided with the lugs entering holes in the bars, is held firmly in place, and the chain cannot be slid away therefrom except by the removal of the cross tie.

What I claim and desire to secure by Letters Patent is—

The tapering connecting bar provided with the lugs $l, l$, entering holes in the rails, in combination with the clamp $e$, driven onto said wedge substantially as specified.

In witness whereof I have hereunto set my signature this twentieth day of February, 1860.

HENRY H. GRAHAM.

Witnesses:
LEMUEL W. SERRELL,
THOS. GEO. HAROLD.